United States Patent [19]

Perini

[11] Patent Number: 4,606,419
[45] Date of Patent: Aug. 19, 1986

[54] TRUCK MOUNTED LOAD SCALE
[75] Inventor: Richard L. Perini, Creswell, Oreg.
[73] Assignee: ACCU-Weigh Systems, Inc., Creswell, Oreg.
[21] Appl. No.: 664,675
[22] Filed: Oct. 25, 1984
[51] Int. Cl.⁴ .................... G01G 19/08; G01G 19/10; G01G 5/04
[52] U.S. Cl. .................................. 177/138; 177/141; 177/209
[58] Field of Search ........................ 177/138, 141, 209
[56] References Cited
U.S. PATENT DOCUMENTS

| | | | |
|---|---|---|---|
| 2,452,124 | 10/1948 | Huston et al. | 177/209 X |
| 2,756,983 | 7/1956 | Furcini | 177/209 X |
| 2,867,433 | 1/1959 | Bergenheim et al. | 177/209 X |
| 3,263,762 | 8/1966 | Langager et al. | 177/141 |
| 3,420,325 | 1/1969 | McAlister et al. | 177/141 X |
| 3,710,880 | 1/1973 | Arden | 177/209 X |
| 4,456,084 | 6/1984 | Miller | 177/141 |

FOREIGN PATENT DOCUMENTS 365836  12/1922  Fed. Rep. of Germany ...... 177/141

Primary Examiner—George H. Miller, Jr.
Attorney, Agent, or Firm—James D. Givanan, Jr.

[57] ABSTRACT

An air/hydraulic scale for use on a truck or trailer and having frame mounted hydraulic cylinders with piston rods contactible with a vehicle axle. Fluid expelled from the cylinders actuates a load indicating displacement cylinder located adjacent the load cylinders. The piston rod assembly of each cylinder is automatically retracted at the end of a loading operation and prior to road travel of the vehicle.

7 Claims, 3 Drawing Figures

TRUCK MOUNTED LOAD SCALE

BACKGROUND OF THE INVENTION

The present invention pertains generally to a truck mounted system for calculating the load carried by a trailer or tractor and trailer combination.

Efforts are found in the prior art directed toward providing a weighing system permanently in place on a vehicle to indicate the weight of a load placed thereon. For one or more reasons the use of such permanently mounted scale systems have not found wide acceptance with the trucking industry. It is still the usual practice to route loaded trucks to a weighing station to calculate load weight. Considerable time is lost when a truck operator must wait in line for such a weighing operation with additional time being lost if the truck is overloaded in which event a portion of the load must be removed back at a loading dock. Should an overload condition be detected at a governmental weighing station, an even further delay is encountered in view of it being necessary to partially unload the truck onto another truck at the site of the weighing station or return of the truck to a truck loading site for partial load removal. All of the foregoing complications contribute to the loss of time which could otherwise be spent in productive over-the-road travel.

A further problem encountered in the loading of trucks is the allocation of weight to axle which if improperly done, can necessitate the return of a truck to a loading site for shifting of a load so as to come within acceptable axle weight limits.

SUMMARY OF THE PRESENT INVENTION

The present invention is embodied within a weighing system permanently mounted in place on a load carrying vehicle to render an accurate indication of load weight.

The present system utilizes hydraulic cylinders having piston rods contactible with axle mounted pads during a weighing operation and which piston rods are normally retracted out of axle pad contact during travel. A displacement cyliner includes a sight gauge with a displacement cylinder piston actuating a load indicator. Fluid displaced from the load cylinders during loading serves to actuate the load indicating piston. At the termination of a weighing operation, the system is depressurized with the load cyliner piston rods retracted as is the displacement cylinder piston to prevent wear and exposure of components to contamination.

Important objectives of the present weighing system include the provision of a truck mounted scale of lightweight, durable construction providing an accurate read out of vehicle load weight; the provision of a weighing system having a scale component conveniently located for monitoring by the truck operator during a loading operation; the provision of a weighing system utilizing a fluid reservoir pressurized from a truck air system to rapidly charge hydraulic cylinders of the system and conversely capable of being rapidly depressurized to over-the-road travel; the provision of a weighing system which substantially avoids contributing to vehicle weight; the provision of a weighing system for use in all environmental conditions without risk of system damage by freezing temperatures.

DETAILED DESCRIPTION OF THE PREFERRED EMBODIMENT

Figure 1:
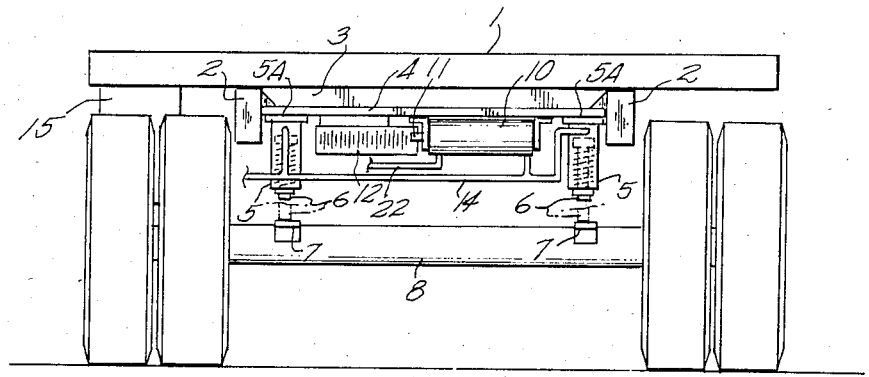
FIG. 1 is a rear elevational view of a vehicle equipped with the present system.
Figure 2:
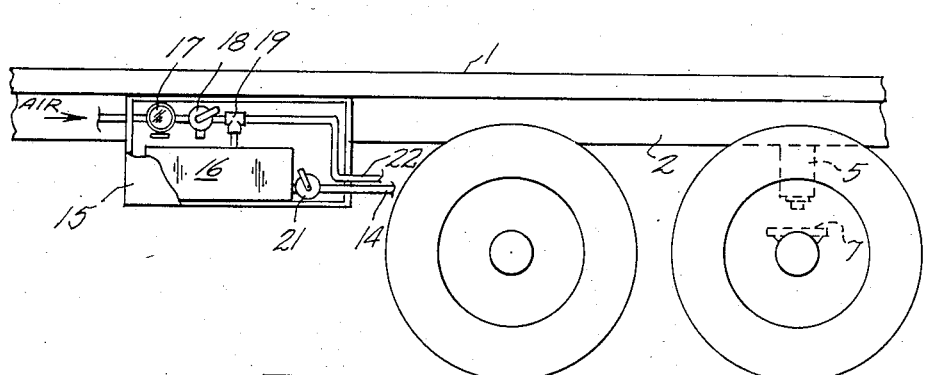
FIG. 2 is a fragmentary side elevational view of a vehicle equipped with the present system.
Figure 3:
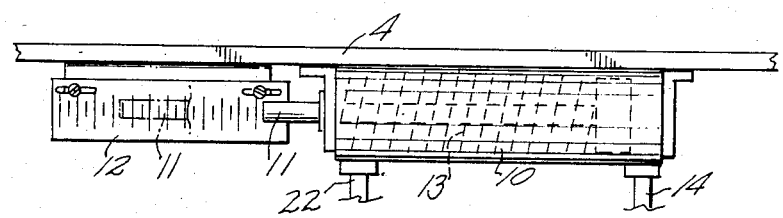
FIG. 3 an enlarged elevational view of a system displacement cylinder and scale.

With continuing attention to the drawing wherein applied reference numerals indicate parts similarly hereinafter identified, the reference numeral 1 indicates generally a load carrying trailer or truck bed.

A trailer frame is indicated at 2. A frame cross member is at 3. A base 4 is carried by the frame and carries hydraulic cylinders 5 of the present system shown as single-acting, spring return cylinders with the springs in each cylinder constituting internal biasing means and with the cylinders mounted at their base ends 5A to base 4. Each cylinder includes a piston and piston rod assembly 6 contactible at its distal rod end, when extended, with an axle mounted pad 7. In certain installations it is feasible to locate the cylinders 5 in a vertical plane containing an axle housing 8 so as to permit the piston rod ends to contact the axle housing when same has a suitable flat surface in which instance the pads 7 are disposed with.

Indicated at 10 is a fluid displacement cylinder having one end in fluid communication via a conduit 14 with the uppermost ends of cylinders 5. Within displacement cylinder 10 is a piston and a piston rod with the latter serving as an indicator 11 integral which functions along with a graduated fixed scale 12 in place on base 4. One suitable scale is marked in 250 pound increments. A seal about piston rod 11 prevents entry of foreign matter into the cylinder interior. Piston rod 11 is normally retracted by a piston return spring 13.

A system reservoir at 16 is located at the vehicle's side in a cabinet 15 and is charged with low pressure air, 10 p.s.i. or so, which is communicated to the reservoir via a gauge equipped, air pressure control means or regulator 17, a three-way air valve 18 and a T-shaped fitting 19. Conduit 14 also serves to communicate the reservoir fluid with displacement cylinder 10 and with single acting cylinders 5. A shut off fluid valve 21 controls fluid flow to the base end of cylinders 5 and displacement cylinder 10. A conduit 22 provides air pressure to the rod end of displacement cylinder 10.

System operation entails the pressurizing of reservoir 16 to a known value from the truck air system prior to the start of a loading operation. Valve 21 is opened to direct fluid into the upper ends of the load cylinders 5 to cause the piston rod ends to abut against the axle. Piston 11 in the displacement valve will be held in a retracted position by spring 13 and system air pressure. Valve 21 is now moved to a closed position while air valve 18 is now moved to a vent position to vent the rod end of displacement cylinder 10. As the load is deposited on trailer bed 1 the vertical distance between said bed and trailer axle will decrease resulting in displacement of fluid from cylinders 5 with fluid entering the base end of displacement cylinder 10 to actuate piston rod 11 which now functions as an indicator on scale 12. At the termination of vehicle loading, valve 21 is repositioned to permit the spring biasing means to raise the pistons of the load cylinders 5 and permit displacement cylinder 10 to expel fluid back to reservoir 16 as the indicator cylinder piston rod is retracted by spring 13. Remaining vehicle axles may be similarly equipped with this system if so desired.

While I have shown but one embodiment of the invention it will be apparent to those skilled in the art that the invention may be embodied still otherwise without departing from the spirit and scope of the invention.

Having thus described the invention, what is desired to be secured in Letters Patent is:

1. A load indicating system for installation on a vehicle having an air pressure system, a load receiving bed and a wheel equipped axle, said system comprising in combination,
   a fluid reservoir for communication with the air pressure system of the vehicle for pressurizing the reservoir,
   air pressure control means in communication with said air pressure source and with said reservoir,
   a displacement cylinder in fluid communication with said reservoir and including extensible load indicator means,
   a scale proximate said load indicator means,
   fluid chargeable load cylinders with piston assemblies for installation on the vehicle frame above said axle, each of the load cylinders having internal biasing means normally raising the piston assembly to a retracted inoperable position, said piston assembly extensible upon load cylinder pressurization into contact with the vehicle axle prior to loading of the vehicle, conduit means communicating said reservoir with said load cylinders, each piston assembly adapted to be partially and upwardly displaced by closing movement between the trailer bed and the vehicle axle during loading of the vehicle bed,
   fluid valve means in conduit communication with said reservoir and displacement cylinder and said load cylinders whereby fluid discharged from the load cylinders during loading of the vehicle will be directed to said displacement cylinder to actuate the load indicator means, and
   repositioning of said fluid valve means and said air pressure control means permitting the normally raised piston assembly of each of the load cylinder to be retracted upwardly by the internal biasing means out of contact with the vehicle axle prior to vehicle travel.

2. The load indicating system claimed in claim 1 wherein said extensible load indicator means is a piston rod.

3. The load indicating system claimed in claim 2 wherein said piston rod is spring biased to a retracted position.

4. The load indicating system claimed in claim 1 wherein said load cylinders are of the single acting spring return type.

5. The load indicating system claimed in claim 1 additionally including a base adapted for attachment to the vehicle above a vehicle axle, said load cylinders being mounted on said base for contact of their piston assembly with said axle.

6. The load indicating system claimed in claim 5 wherein said displacement cylinder and scale are mounted on said base intermediate the load cylinders.

7. The loading indicating system claimed in claim 1 wherein said load cylinders are of the single acting spring return type, said load cylinders having base ends for securement to the vehicle.

* * * * *